May 21, 1957
G. M. EHLERS
2,793,333
ELECTRICAL CAPACITOR
Filed July 5, 1951
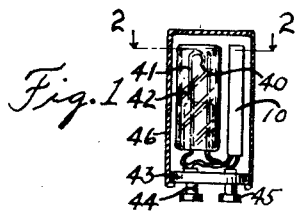
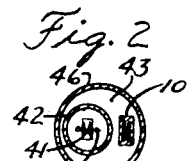
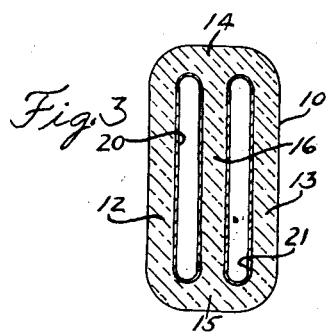
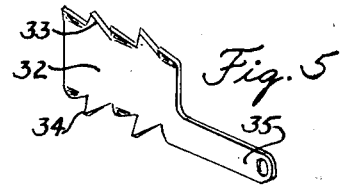
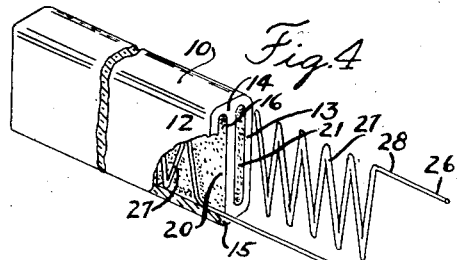
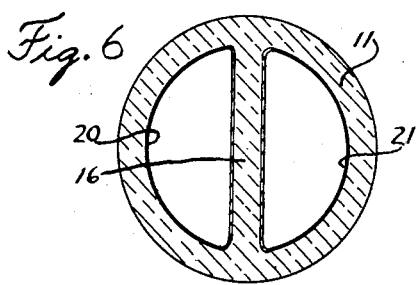
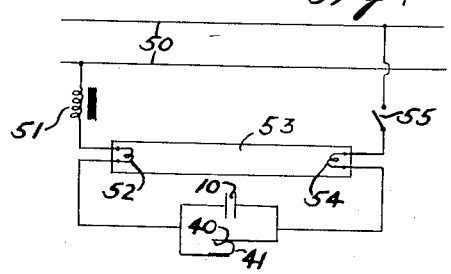
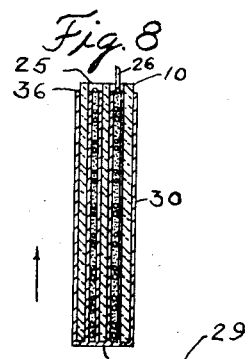
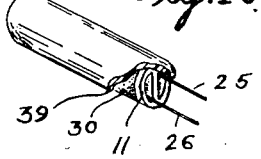
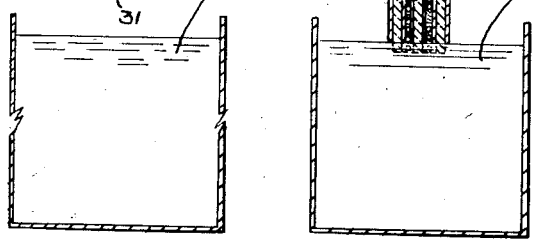
INVENTOR
GEORGE M. EHLERS
BY
Arthur G. Connolly
HIS ATTORNEY

United States Patent Office 2,793,333
Patented May 21, 1957

2,793,333
ELECTRICAL CAPACITOR

George M. Ehlers, Milwaukee, Wis., assignor to Sprague of Wisconsin, Inc., a corporation of Wisconsin Application July 5, 1951, Serial No. 235,116

2 Claims. (Cl. 317—242)

The present application is in part a continuation of co-pending application Serial No. 35,577, filed June 28, 1948, and now abandoned.

This invention relates to capacitors especially adapted for use in spaces of limited size or in conductively enclosed devices such as starters for discharge lamps.

Discharge lamps, such as lamps coated with fluorescing substances or phosphors usually include opposing filaments to be heated to electron-emitting condition for starting a current flow through a vapor or gaseous medium between the filaments. Electrode heating current is applied by a series circuit including a current-limiting inductor. The series circuit is controlled by a starting switch which opens after the lamp electrodes have been sufficiently heated.

Starting switches now in use include auxiliary gas filled tubes with a fixed electrode spaced from a U-shaped bimetallic electrode heated by a glow discharge occurring when sufficient potential such as the full line voltage is applied across the terminals of the tube. The heat from the glow discharges flexes the bimetallic electrode into contact with the fixed electrode to shunt out the glow discharge and cause the bimetallic electrode to cool. By the time it has cooled sufficiently to flex away from the fixed electrode the lamp filaments have become heated. At the breaking of the filament-heating current, a voltage surge is provided, as by an inductor connected in the circuit. This surge strikes the principal arc discharge between lamp's heated filaments. The starting switch should be connected in parallel with a capacitor (usually .006 mf.) for the purpose of shunting out harmonic electric waves produced by the principal discharge to keep these harmonics from feeding back from the lamp into the power line and causing interference in the operation of radios connected with such power line.

The starting switch and its capacitor should be of such size and shape that they can be enclosed within a metallic housing of predetermined dimensions for insertion in the limited space available in the fluorescent lamp fixtures. It is desirable that such capacitor be of a character such that visual inspection is sufficient to determine that the capacitor is in operative condition. The capacitor should be readily adjustable to the desired capacitance, should be as inexpensive as possible and should be such that no separate insulation is required between it and the lamp starter housing.

Among the objects of the present invention is the provision of improved capacitors that fulfill the above requirements, as well as novel methods for more readily making these capacitors.

Additional objects and advantages of the present invention will be apparent from the following description of several of its exemplifications.

Generally, the capacitor of the present invention comprises an elongated tubular dielectric with a pair of internal longitudinally-extending passageways, a closely engaging terminal lead member within the passageway, and an adherent electrically-conductive bonding stratum extending over the internal surface of the passageway and onto the terminal lead member, forming an electrode and establishing a firm electrical and mechanical connection between the electrode and the lead member. The tube can be a high dielectric constant ceramic of substantially rectangular, circular or crescent shaped cross section and with a central wall or partition between the two end walls or diametrically across or between the crescent sides of the tube. Two substantially equal area passages are thus formed in the tube and two equal areas and substantially parallel flat surfaces are provided with corners of relatively short radii adjacent the edges of the flat surfaces.

The interior surfaces of the two passages are covered as continuously as possible with a conductive material. The coatings on the two flat surfaces form capacitor electrodes while other portions of the coatings serve for mechanically and electrically connecting terminals with the capacitor electrodes. It will be understood that a multi-capacitor unit may also be formed by providing conductive coatings on the exterior surface of a partitioned tube to co-act with the interior coating or coatings in whole or in part and that the entire structure may then be coated with insulation such as one of the thermosetting plastics.

The terminals may be part of terminal lead members in the form of resilient wire with angularly disposed or zig-zag portions of such width that they are larger than the maximum transverse dimension of the passageways and may be pressed into seated position, in the rounded corners for example, by exerting only such force as to cause the bends of the zig-zag terminal portions to penetrate into the coatings and be engaged by inequalities in the surfaces of the dielectric, particularly where it is ceramic. Alternatively the angularly disposed portions may be stretched to contract them so that they can be slipped in place and then released. They thereupon resiliently expand to frictionally engage the internal surface of the passageway. On the other hand the terminals may be sheet metal with serrated edges, the width of a portion thereof being such that the serrated edges are engageable in the interior rounded corners or other interior surface portions of the tube. The terminal teeth can be so shaped that the terminal may be readily drawn into the tube passages in one direction but will be fixed therein against movement in the other direction. The teeth are preferably "set" as is the case with sawteeth to provide points engageable in the walls before or after the conductive coatings are applied. The conductor attaching portion of the terminal can be of lesser width than the insertable portion of the terminal and can extend from and along one side of the passage in which it is pocketed so that they can be spaced at substantially diametrically opposite points at one end of the tube.

According to a preferred method of making the above capacitor the terminal members are inserted before the conductive coatings, and the coatings then introduced into the passageways as a fluent coating mixture having an adhesive binder and a sufficient amount of electrically conductive particles to simultaneously provide an electrically conductive capacitor electrode stratum and a firm electrical and mechanical connection between this stratum and the terminal member. This assists in securely holding the terminals in place with a noise-free connection without introducing any complication into the making. The introduction of the coating mixture is conveniently made by dipping, followed by removal of excess coating that extends between two different terminals so that these terminals are suitably insulated.

The above features are more fully set forth in connection with the accompanying drawings wherein:

Fig. 1 is a longitudinal sectional view through an assembled fluorescent lamp starter employing the capacitor of the present invention;

Fig. 2 is a cross sectional view taken on the plane of line 2—2 of Fig. 1;

Fig. 3 is an enlarged transverse sectional view of a capacitor of the present invention;

Fig. 4 is a perspective view, with portions broken away, of the capacitor shown in Fig. 3, with terminal leads, one attached and one about to be attached to the electrodes;

Fig. 5 is a plan view of an alternate form of terminal for the present capacitor;

Fig. 6 is a sectional view of a capacitor differing in shape from that shown in Figs. 3 and 4;

Fig. 7 is a circuit diagram of a lighting circuit having a fluorescent lamp and its starter;

Figs. 8 and 9 are sectional views showing steps in a preferred method of making the new capacitor; and Fig. 10 is a partially broken view of a completed capacitor exemplifying the present invention.

Referring to the drawings, the present capacitor is generally designated by numerals 10 and 11 designating a substantially rectangular and a cylindrical shape respectively. Capacitor 10 comprises a flattened tube having larger wall portions 12 and 13 and smaller wall portions 14 and 15 and with a central wall portion 16 extending between the smaller wall portions. It will thus be seen that two equal area passages with flat sides and rounded ends, extend through the tube. The tube is preferably made from one of the known ceramic mixtures having a high dielectric constant but may be made of less expensive material or with a lower dielectric constant dependent on the space available for the capacitor. The high dielectric constant tubes may have dielectric constants of about 3000 or more, and may be made as shown for example in the Forrester et al. U. S. Patent No. 2,494,699, granted January 17, 1950.

A tube shaped as shown, provides interior surfaces for the reception of coatings 20 and 21 forming the conductive electrodes or plates of the capacitor. The coatings are formed by introducing a suitable fluent mixture through the passages in such manner that the mixture will adhere to all of the interior surfaces and form continuous electrically conductive coatings. The use of mixtures of this type containing adhesive binders, conductive particles and solvents is described in the National Bureau of Standards Circular 468, issued November 15, 1947, pages 7, 8, 9, 14, 15 and 16. It is preferred, however, to use mixtures which form coatings having specific resistivities not higher than 0.5 ohm-centimeter. One highly effective coating mixture has a specific resistance of about 0.2 ohm-centimeter and has the following formulation in parts by weight:

| | |
|---|---|
| Graphite | 20.7 |
| Lampblack | 13.3 |
| Thermosetting phenol formaldehyde resin | 14 |
| Resin solvent | 52 |

However, other conductive particles, resins and formulations can also be used.

Only the portions of the coatings on the two surfaces of the central or partition wall 16 are really effective as capacitor plates in the illustrated constructions, while the remainder of the coatings serve to provide conductive connections between the plates and the terminals. It will be seen that the plates 20, 21 are enclosed within the ceramic body which therefore insulates the conductive plates from contact with parts externally of the tube.

The conductive plates are severally provided with terminal lead members generally designated 25, 26 for connection into a circuit to be described. In the form shown in Fig. 4 the terminals are formed from somewhat resilient wire and have zig-zag portions 27 and a straight portion 28. The zig-zag portions 27 can be made with relatively sharp bends and of such dimensions that it has a transverse width larger than that of the passageway in which it is to be fitted. By threading the straight portion 28 of the terminal members completely through this passageway it can be used as a handle to pull the zig-zag portions into place in the tube passages. The resistance of the passageway walls against passage of the oversize portions 27 causes these portions to be stretched in length and thereby contracted in width so that they are pulled into the passageway. When the terminals are in place the pulling is terminated permitting the angular bends to engage in the rounded corners of the passage walls so that any attempt to push the terminals out of the passages will merely cause the bends to seat more firmly in the coatings and to be gripped more firmly by the slight inequalities usual in these types of surfaces, particularly where the tube is ceramic.

Fig. 5 shows a modified form of terminal made of sheet metal and formed with a portion 32 having serrated edges 33, 34, and with a conductor attaching portion or shank 35. The portion 32 is of such width as to be engageable in the interior rounded corners of the tube passages while portion 35 is only of such width as is necessary for attachment thereto of a circuit conductor. The teeth of edges 33, 34 may be "set" as in the manner of saw-teeth. Hence, when the present terminal is drawn through a passage in one direction, the teeth engage the internal wall surfaces of the passageway along a plurality of lines and make conductive connection with the conductive coating 20 or 21, if the coatings are applied before the terminal is inserted. Movement of this type of terminal from the position in which it is inserted is prevented by engagement of the surface irregularities of the tube by the teeth points. The shank 35 can also be made relatively soft so that pushing it causes it to fold before it can transmit sufficient force to move the body position 32 out of place.

Fig. 6 shows a modified form of capacitor similar in all respects to that above described excepting in external shape, and accordingly having the same reference numerals applied thereto. Because of the cylindrical shape, however, it is easier to make visual inspection of the coatings in this modification and such shape is accordingly preferred where it can be fitted within the dimensional limitations on the capacitor.

For greater compactness the capacitor of the present invention can be made in crescent shape to more closely fit alongside a cylindrical object such as a glow-discharge switch. This shape is readily provided by correspondingly shaped extruding forms or by deforming the rectangular or cylindrical shapes of the tubes of Figs. 3 and 6 before these tubes are cured or fully hardened.

According to a preferred phase of the present invention, the capacitor electrodes, or conductive coatings 20, 21 are applied after the terminal lead members 25, 26 or 32 are inserted in place in their passageway. For this purpose the terminal-lead-carrying dielectric tube 10, for example, can be merely dipped into a quantity of fluent coating mixture 29, as more clearly shown in Fig. 8 which illustrates the coated tube as it is withdrawn from the mixture 29 after the dipping is completed. The coating mixture adheres to all surfaces introduced into the fluent body 29, and as indicated at 30 and 31 extends over the external surfaces as well as one end of the tube. It is preferred as indicated at 36 to limit the dipping so that at the upper end of the tube an uncoated margin remains. The coating mixture also adheres to all portions of any exposed surface within the passageways.

After dipping is completed, the coating 31 at the lower end of the tube is removed as by wiping or as indicated in Fig. 9 by a second dip, this time in solvent or dispersant 37 for the applied coating mixture. This effectively separates the coating portions within the respective passageway so that the capacitor electrodes are suitably insulated from each other. If desired, this removal can also extend to the margin of coating 30 adjacent the coating 31 as, for example, by suitably adjusting the depth of the dip illustrated in Fig. 9. It may be advisable, as where the coating mixture tends to run in the dispersant 37, to at least partially dry the coating after the initial dip to reduce the tendency to run, or to combine the dip of Fig. 9 with a supplementary wiping to remove conductive particles that may find their way to the portions of the tube that are contacted with the dispersant. For removing portions of the coating it is very convenient to use a rotating brush moistened with coating solvent and to bring the desired portions of the coated tube against the rotating wheel. Where narrow portions are to be removed the rotating brush can have a correspondingly narrow width.

The curing of the coating mixture can then be effected with or without the removal of the external coating 30. This not only develops the final electric conductivity of the coating strata to provide the capacitor electrodes, but also causes the coating binder to mechanically bind the terminal lead members. As a result the lead members are securely mechanically and electrically held in place by noise-free connections. This desirable result is also obtained where the terminal lead member of Fig. 5 is used.

A feature of this phase of the invention is that not only does it become unnecessary to use soldering operations in the manufacture of the subject type of capacitor, but in addition the application of the conductive coatings is reduced to a very simple sequence of steps that can all be performed by use of automatic machinery. This greatly reduces the cost of manufacture.

It is preferred to leave the external coating 30 on the final capacitor unit inasmuch as the final capacitance is much greater with this coating than without. Apparently there is sufficient capacitance between each inner coating and the outer coating so that notwithstanding the series connection of these collateral capacitance, they still contribute an appreciable effect. This effect is large enough to permit close adjustment of the final capacitance by suitable control of the size of coating 30, by selective removal for example.

Where desired, the capacitor of the present invention can be protected from external influences such as moisture as by coating with suitably impervious material those surface portions of the tubular dielectric along which arcing may take place between the two capacitor electrodes. Such a protective coating which can conveniently be a resin, preferably of the thermosetting phenol-aldehyde condensation type with or without fillers, can be applied to the two ends of the dielectric tube after completion of the capacitor. Alternatively, the entire capacitor can be enveloped in such a protective sheath as by suitable dipping.

Fig. 10 shows a completed capacitor construction with the dielectric tube 11 of the type shown in Fig. 6 and with the terminal lead members 25, 26 as shown in Fig. 4. These lead members have angularly disposed portions 27 of greater transverse width than that of the widest portion of the passageway in the tube. Accordingly, these angularly disposed portions will wedge themselves into these passageways adjacent to the protective wall 16. The leads 28 of the respective lead members are preferably positioned in opposite portions of the respective passageways so that they are as far apart as possible where they emerge from the dielectric tube. A protective resin sheath 39 is here shown as enveloping the entire assembly including the bases of the leads. In order to more readily apply the resin sheath without permitting this resin to enter the passageways in any appreciable amount, the resin coating composition can be substantially or entirely free of solvent so that it is quite viscous and does not readily flow in the narrow passageways of the present invention. The protective coating mixture can even be in the form of powdered solids and the capacitor unit can be heated to a temperature above the melting point of these solids and then dipped into the mixture to cause the solids to melt and adhere entirely to the external surfaces of the dipped units. For added moisture imperviousness the resin sheath 39 can be impregnated with strongly moisture repellent material such as waxes. The protective coating can also be permitted to flow into and partially or completely fill the condenser passageways, if desired.

In place of the protective resin described above other types such as those of the melamine-aldehyde, aniline-aldehyde, aniline-phenol-aldehyde, glyptals, alkyds, urea-aldehydes, silicones, etc., can also be used. Thermoplastic resins are suitable where the final capacitor is not subjected to temperatures high enough to cause these resins to drip and uncover the dielectric tube. Some of these resins such as the silicones are sufficiently water repellant so as not to require additional impregnation with a wax for example.

A complete starter structure for a fluorescent lamp includes a capacitor 10, above described, together with a glow discharge tube forming a thermal switch, the glow tube including a fixed electrode 40 and a movable U-shaped bimetallic electrode 41 enclosed in a bulb 42 which is filled with a gas allowing a glow discharge therethrough except at low voltage (about half the line voltage). Both the capacitor and the switch are mounted on an insulation disc 43 with terminals 44, 45 and are enclosed within a housing 46 (see Figs. 1 and 2) which must be no larger than given dimensions so that the assembled starter may be employed within the limited space provided therefor in fluorescent lamp fixtures now in use. The housing is cylindrical and the capacitor may, if desired, be given a crescent shape to fit partially around the switch and to have an outer contour fitting within the housing itself. Alternatively, the capacitor can be in the form of a cylinder flattened adjacent the switch bulb, or the bulb 42 can be flattened adjacent the capacitor to provide more room, or the bulb can have a crescent shape to fit with a cylindrical capacitor. Terminals 44, 45 are connected in parallel with the switch electrodes and with the capacitor terminals.

The starter is connected in a fluorescent lamp circuit as shown diagrammatically in Fig. 7. In such a circuit one conductor of power supply line 50 is connected through a current limiting means or ballast shown as inductor 51, with one end of one electrode filament 52 of a fluorescent lamp 53. The other end of the lamp electrode 52 is connected through the starter circuit 40, 41 to one end of the second lamp electrode 54. The other end of electrode 54 is connected with the other conductor of power line 50 through on-off switch 55.

Upon closure of switch 55, the full line voltage appears across the spaced electrodes 40, 41 of the glow tube and causes a glow discharge to take place between them. The discharge heats the bimetallic electrode 41 which flexes into contact with the fixed electrode 40, and also establishes an appreciable current flow through the lamp filament circuit for a sufficient length of time to heat the electrodes of fluorescent lamp 53. As soon as the glow discharge electrodes are brought in contact with each other, the glow discharge is short circuited and ceases, leaving the bimetallic electrode to cool and return to its original position interrupting the starting circuit. This interruption causes the magnetic energy stored in inductor 51 to generate a momentary surge of sufficient voltage to strike the main discharge between the heated lamp electrodes 52, 54. Upon the initiation of this discharge, the voltage between electrodes 52, 54 drops to a value too low to create a glow between electrodes 40, 41 and the starter circuit is accordingly effectively disconnected while the main lamp stays lit. However, the capacitor 10 does remain connected and effectively short-circuits high frequency harmonics developed by the lamp discharge.

The capacitor of the present invention can also be used with the so-called instant starting or cold cathode fluorescent lamps which have electrodes that are not in the form of heater filaments. These types of lamps are operated with a ballast that delivers a voltage to the unlit lamp high enough to strike the discharge arc between cold electrodes, and also limits the electric current passed by the discharge so as to prevent damage to the tube. No starter (other than the usual on-off switch) is needed for these lamps but the generation of high frequency harmonics by the discharge still calls for a filtering capacitor. Here, however, the filtering capacitor is generally fitted within some available space in the ballast container. For compactness purposes these ballasts are made as small as possible so that the space available for a filtering capacitor is very restricted.

An additional feature of the present invention is the fact that the ceramic type of dielectrics has a much longer life than the paper ordinarily used in prior art fluorescent lamp starter capacitors and can accordingly be mounted within the normally sealed ballast container with the assurance that capacitor failure will not unduly shorten the life of the ballast.

The present capacitor takes advantage of the fact that it is possible to form a tubular dielectric more cheaply than other forms, that coating the entire surfaces of the dielectric is simpler than the coating of partial areas, and that the terminals are connected with the interior tube plates without soldering.

The capacitor of the present invention can also be in the form of a multiple capacitor unit as by connecting a third terminal lead member to the external coating 30. A suitable external terminal construction has a resilient spirally shaped wire having a normal spiral diameter smaller than the cylinder's exterior. The turns of the spiral can be spaced from each other so that when they are compressed together the spiral diameter increases sufficiently to permit them to slip over the cylinder. When released, the turns tend to return to normal shape and become tightly embraced around the external surface of the cylinder.

Alternatively, a large number of individual capacitances can be provided as by dividing the exterior and/or interior surface coatings into two or more separate portions with controlled partial dipping of opposite ends of the tube with or without additional subdivision of the external coating as by wiping. If the terminal-securing advantages of the subsequent coating dip are not desired the terminals for both the exterior and interior surfaces can be applied subsequent to the coating. Although not as noise free, the resulting capacitors are still satisfactory notwithstanding the elimination of soldering. Where the desired capacitance is not too large, the capacitor dielectric may be a low dielectric constant material such as various resins now known and which can also be readily extruded in tubular form. Whether or not the present form of dielectric is externally coated to form additional capacitor plates, the entire structure can be readily insulated by an outer sheath of thermosetting material as indicated above.

A further feature of the present invention is the fact that the capacitor made as indicated above can be fitted within conductive housing 46, as indicated in Fig. 2, without requiring the separate insulation normally used within the housing. This prior art insulation is generally in the form of a fiber board tube having a size that enables it to be slipped into the housing around the glow switch 42 and capacitor 10, and is a separate component that requires special handling and adds materially to the cost of production.

Not only is it unnecessary to use the prior art insulation with capacitors of the present invention having the external protective coating as shown in Fig. 10, for example, but where it is unnecessary to use the external conductive coating 30 neither the prior art insulation nor the protective coating 39 is needed. In such a simplified construction the outer dielectric wall of the capacitor itself provides all the desired insulation.

As many apparently widely different embodiments of the invention may be made without departing from the spirit and scope hereof, it is to be understood that the invention is not limited to its specific embodiments hereof except as defined in the appended claims.

What is claimed is:

1. A capacitor having an elongated tubular dielectric small enough to fit inside a fluorescent lamp starter, said tubular dielectric having two internal longitudinally-extending passageways; a terminal lead member within each passageway, an adherent electrically-conductive stratum extending over the internal surface of each passageway, each stratum forming an electrode, and contacting the respective terminal lead member, each terminal lead member is an elongated wire including angularly disposed resilient portions normally extending transversely a distance greater than the maximum transverse width of the passageway, said angularly disposed portions being resiliently compacted and frictionally engaged against the internal surface of their passageway by the resiliency, to assist in holding the lead member in place.

2. The combination of claim 1 in which each electrically-conductive stratum is a bonding stratum extending as a continuous layer over both the internal surface of its passageway and the surface of the frictionally held terminal lead portion, to help bond the lead members in position.

References Cited in the file of this patent

UNITED STATES PATENTS

| | | |
|---|---|---|
| 1,255,597 | Giles | Feb. 5, 1918 |
| 1,479,315 | Pickard | Jan. 1, 1924 |
| 1,810,385 | Austin | June 16, 1931 |
| 2,115,642 | Martin | Apr. 26, 1938 |
| 2,143,369 | Dubilier | Jan. 10, 1939 |
| 2,172,604 | Blackburn | Sept. 12, 1939 |
| 2,395,442 | Ballard | Feb. 26, 1946 |
| 2,398,176 | Deyrup | Apr. 9, 1946 |
| 2,441,213 | Sutter | May 11, 1948 |
| 2,452,026 | Feinberg | Oct. 19, 1948 |
| 2,569,655 | Cage | Oct. 2, 1951 |
| 2,601,081 | Arvidson | June 17, 1952 |

FOREIGN PATENTS

| | | |
|---|---|---|
| 601,961 | Germany | Aug. 28, 1934 |
| 613,731 | Germany | May 31, 1935 |
| 482,459 | Great Britain | Mar. 30, 1938 |
| 628,233 | Great Britain | Aug. 24, 1949 |

OTHER REFERENCES

Erie Resistor Corporation, advertisement in "Electrical Engineering," April 1945, page 13.